Jan. 9, 1968     T. A. BRANDON, JR     3,362,756
SPLIT SYSTEM CONTROL VALVE FOR FLUID PRESSURE SERVOMOTORS
Filed May 16, 1966
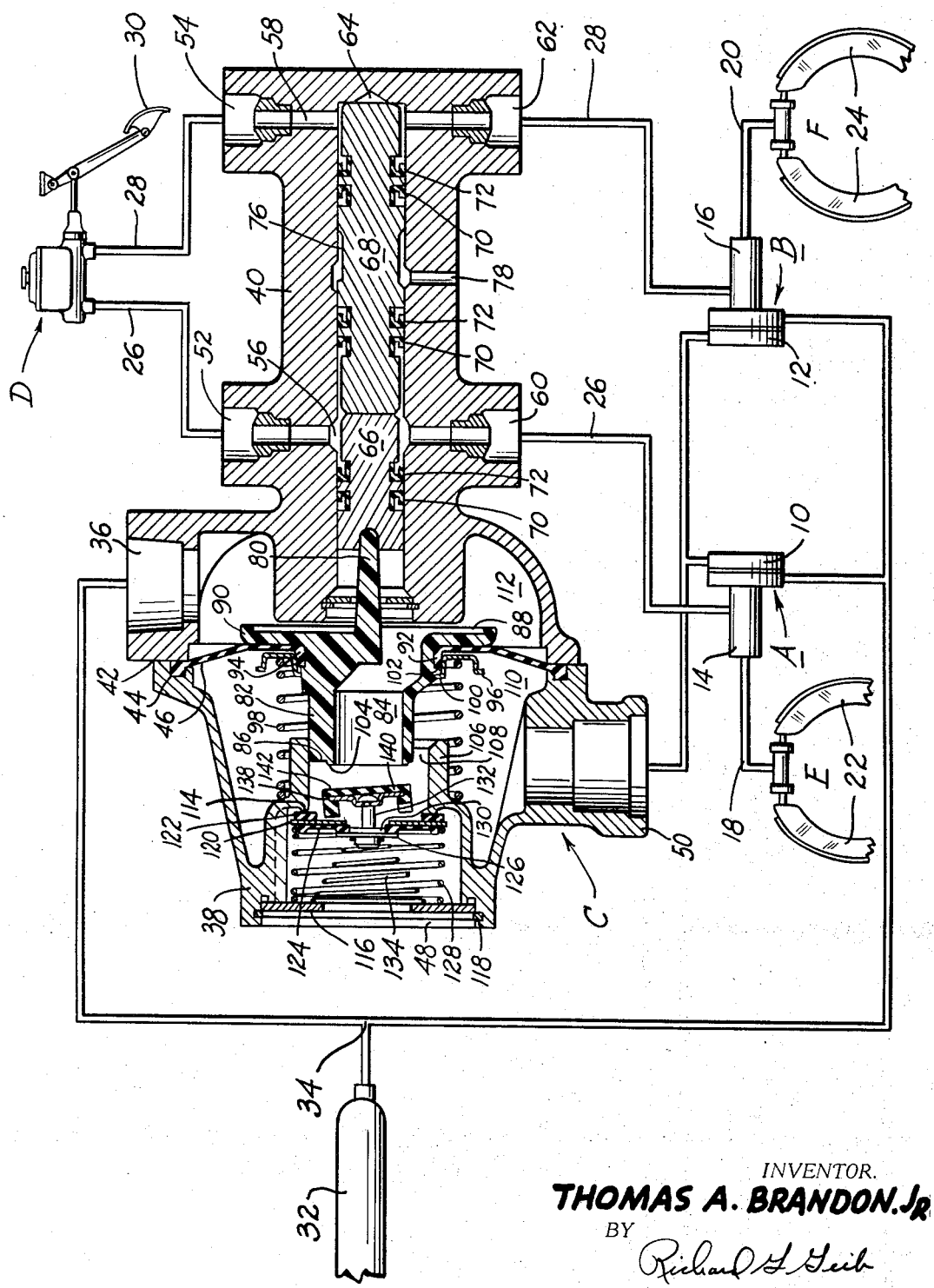
INVENTOR.
THOMAS A. BRANDON, Jr
BY
*Richard L. Geib*
ATTORNEY.

United States Patent Office 3,362,756
Patented Jan. 9, 1968

3,362,756
SPLIT SYSTEM CONTROL VALVE FOR FLUID
PRESSURE SERVOMOTORS
Thomas A. Brandon, Jr., Ann Arbor, Mich., assignor to
The Bendix Corporation, a corporation of Delaware
Filed May 16, 1966, Ser. No. 550,488
6 Claims. (Cl. 303—13)

The present invention relates to fluid pressure servomotor control valves; and more generally to the provision of means to provide fail-safe operation thereof.

An object of the present invention is to equalize the output pressure of split system servomotors.

It is also an object of the present invention to provide a new and improved control valve for a fluid pressure servomotor and the like that may be operated by one or multiple means.

Another object of the present invention is the provision of a new and improved single poppet control valve that may be operated by one or more pistons arranged to individually or collectively actuate the poppet control valve.

A still further object of this invention is to provide a new and improved single poppet control valve operated as aforesaid which control valve includes cooperating valve seats and poppet sealing surfaces formed at a slight angle relative to one or the other so that engagement therebetween is gradual during the actuation of the valve.

Still another object is to eliminate the effect of different pressures created by split system master cylinders controlling individual servomotors.

The invention resides in certain constructions and combinations and arrangements of parts, and further objects and advantages of the invention will become apparent to those skilled in the art to which the invention relates from the following description of a preferred embodiment described with reference to the accompany drawing forming a part of the specification in which a control valve according to the principles of this invention is shown in cross section in a schematic split system power braking arrangement for a vehicle.

In more detail, the system shown in the drawing generally comprises servomotors A and B controlled by a single valve C that is in turn controlled by a tandem master cylinder D for monitoring a communication of vacuum or atmosphere to the servomotors A and B for actuation of the wheel cylinders E and F of the vehicle brakes.

Since the principles of this invention do not include the construction of the servomotors A and B, it is believed sufficient for the purpose of this disclosure to describe generally the servomotors to include a movable wall within a pair of pressure chambers 10 and 12 which operates a piston within the respective pair of slave cylinders 14 and 16 to develop fluid pressure conducted by respective conduits 18 and 20 to the wheel cylinders E and F for actuation of the brake shoes 22 and 24 for the respective wheels of the vehicle.

In order to actuate the servomotors A and B, the control valve C is inserted in the lines 26 and 28 leading from the master cylinder D that is operated by the operator pushing on a brake pedal 30. As will be understood by those skilled in the art the pistons in the slave cylinders 14 and 16 are connected to the movable walls in the chambers 10 and 12 such that in absence of power fluid pressure from the lines 26 and 28 is communicated through the slave cylinders to manually operate the brakes E and F. This communication is terminated in the event power is available to prevent fluid displacement from the master cylinder to the brakes after the initial expansion brake shoes 22 and 24 in the normal situation to be in slight contact with drums of the associated wheels.

Furthermore, an intake manifold 32 for the engine of the vehicle is connected by means of a conduit 34 to the servomotors A and B and a reference fluid pressure port 36 of the control valve C, so as to suspend the movable walls within the servomotors 10 and 12 whenever the master cylinder D is in its nonactuated state.

With particular reference now to the control valve C, a housing is constructed from two cast portions 38 and 40 that are joined together, as at 42, by a plurality of radial bolts (not shown). At the juncture of the housing members 38 and 40 a bead 44 of a diaphragm 46 is compressed between the members 38 and 40 to seal the juncture. As seen, the housing member 40 includes the reference fluid low pressure port 36; whereas the housing member 38 is provided with an atmospheric air or high pressure entry port 48 and a valve control port 50. In addition, the housing member 40 is further provided with hydraulic pressure inlet ports 52 and 54 leading to annular chambers 56 and 58 which are in turn communicated to hydraulic outlet ports 60 and 62. The ports 52 and 54 as well as ports 60 and 62 are connected to the conduits 26 and 28, so that the control C is operatively arranged in the hydraulic system between the master cylinder D and the slave cylinders 14 and 16. As may be realized by those skilled in the art to which this invention relates, this interpositioning of the control C in the hydraulic system provides for manual development of hydraulic pressure in the event of power failure which is directed through the slave cylinders 14 and 16 to the wheel cylinders E and F for manual actuation of the brakes 22 and 24.

The housing member 40 is additionally provided with a longitudinal bore 64 within which a pair of pistons 66 and 68 are reciprocally mounted. These pistons each comprise a plurality of seals 70 and 72 to prevent fluid communication from one side of each of the pistons to the other side of each of the pistons. Furthermore, the piston 68 is machined to have a recess portion 76 intermediate its length with seals 70, 72 on either side thereof, and the housing member 40 is provided with a radial opening 78 to permit venting of any leakage fluid between one face of the piston 68 towards the other face thereof. As may be readily realized, this will prevent the entrapment of fluid between the pair of seals 70, 72 that could hinder the operation of the control C and to prevent possible double failure.

The piston 66 is formed with a recess receiving a stem 80 of a plunger 82, which in a preferred embodiment is formed as a solid plastic member having an axial opening 84 extending therethrough from a forward face 86 to the rearward face 88 thereof. This plunger is formed with a radial flange 90 adjacent the rearward face 88 and with a recess 92 on the forward side of the radial flange for receiving an annular beaded portion 94 of the diaphragm 46. A diaphragm and spring bearing plate 96 is held by a spring 98 to compress the bead 94 in the recess 92 and by means of an inwardly turned flange 100 to bear against a shoulder 102 of the plunger 82 to abut the stem 80 in the recess of piston 66 and thereby abut the piston 66 against the piston 68. The forward face 86 of the plunger 82 is provided with an annular valve seat 104 either by machining or molding during the process of formation of the plunger 82.

The housing member 38 is provided with an inwardly positioned collar 106 which supports and guides the plunger 82 in its reciprocatory movement within the control C. As seen, the plunger 82 is further formed so as to provide a passage 108 at spaced intervals between it and the collar 106 for fluid communication thereby. Furthermore, the sealing of the diaphragm 46 at the juncture of the housing members 38 and 40 and the attachment thereof to the plunger 82 creates a first variable volume chamber 110 ahead of the diaphragm and a second variable volume chamber 112 to the rear of the diaphragm that are communicated by the passage 84 through the plunger 82 so that normally the reference pressure at port 36 is directed through the control C to the valve control port 50.

The collar 106 is machined to provide a fixed valve seat 114 facing the atmospheric port 48. An annular spring bearing plate 116 is held within the atmospheric port 48 by a retainer ring 118, and a first valve poppet 120 comprised of a rubber valve seat 122 and a rubber facing 124 having an annular opening supported by an annular bead 126 is urged against the valve seat 114 by means of a spring 128 between the annular plate 116 and the valve poppet 120. Furthermore, a spool valve 130 having a stem 132 is held within the annular opening through the beaded portion 126 of the rubber facing 124 by means of a spring 134 compressed between the plate 116 and the spool 130. A plate 138 is affixed to the stem 132 at an angle with respect to the plane of the valve poppet 120. A rubber facing 140 is affixed to the annularly arranged plate 138 so that its rearwardly facing surface 142 extends along a line at an angle to the plane of contact of the rubber seat 122 with the valve seat 114 of the collar 106.

In operation, the operator of the vehicle upon depressing the pedal 30 will create fluid pressure within the lines 26 and 28 that in turn develop pressure in the chambers 56 and 58. If the pressures in lines 26 and 28 are unequal and the pressure in line 28 is the greater, then the pistons 66 and 68 move as a unit, to the left, as viewed in the drawings, to move the plunger 82 within the collar 106 until the valve seat 104 contacts the surface 142 of the rubber facing 140. If the pressure in line 26 is greater than in line 28 or if pressures are equal, then piston 68 remains stationary and piston 66 moves to the left to operate the valve as before. At this point the reference fluid pressure at port 36 is prevented from communication to the control port 50. At the same time this hydraulic fluid pressure in conduits 26 and 28 flows through the chambers 56 and 58 to the slave cylinders 14 and 16 to begin to pressurize the wheel cylinders E and F to expand the brake shoes 22 and 24 into contact with the drums of the vehicle wheels (not shown).

Upon further pressure being developed to begin to decelerate the vehicle, the pistons 66 and 68 due to the abutment of the valve seat 104 with the surface 142 will cause the spool valve 132 to be removed from the inner beaded portion 126 of the rubber facing 124. At this point atmospheric air from the port 48 is metered through the opening between the spool 132 and the rubber facing 124 to the valve control port 50. Upon still further pressurization of the master cylinder the rubber facing 140 will contact the poppet 120 to remove the rubber seat 122 from the fixed seat 114 of the collar 106 to thereby permit a maximum of atmospheric pressure to enter through the passages 108 about the plunger 82 to the valve control port 50 to thereby create a maximum pressure differential in the motors 10 and 12.

As may be appreciated by those skilled in the art, as soon as any pressure differential is created within the motors 10 and 12, the connection between the master cylinder D and the slave cylinders 14 and 16 is terminated and pressure is developed by the slave cylinders independently and to a greater extent than is developed in the master cylinder D.

If one of the lines 26 or 28 from the master cylinder D should happen to break, then the pressure within the chamber 56 or 58 would not be effective to reciprocate the plunger 82. However, the pressure in the non-failed chamber 56 or 58 will be available for actuation of the plunger 82 to control both of the servomotors A and B; thus, each of the servomotors is essentially fail-safe in operation.

In prior art systems manufacturers have suggested using two servomotors having their own valving. In such systems it is quite typical to have a boost ratio (input pressure to output pressure) of ten to one. Split system master cylinders to date generally have a pressure differential of 50 p.s.i. This means that, if the servomotors A and B each have valves for controlling the operation thereof that are each activated by the independent pressures created by the master cylinder D, there would be a 500 p.s.i. pressure differential operating the wheel brakes E and F.

With my invention, using a single valve C for controlling the servomotors A and B, experience has shown less than 40 p.s.i. pressure differential at the wheel brakes E and F.

Furthermore, and referring first to the prior art systems again, it is not unusual to experience an additional 350 p.s.i. differential for a total of 850 p.s.i. differential between brakes E and F due to the servomotors individual valves and their individual tolerances. With my invention experience has shown that all but seal frictions, spring tolerances, bore diameter differences, etc. of the slave cylinders 14 and 16 have been eliminated to reduce the expected pressure differential to the order of 5 to 10 p.s.i.

Thus, my invention in accomplishing the foregoing objects reduces the pressure differential between the brakes E and F to less than 50 p.s.i. in tests so far, and this means more equal braking and better brake wear characteristics with less occurrence of brake fading under repeated operation.

While the invention has been described in considerable detail, I do not wish to be limited to the particular construction shown and described; and it is my intention to cover hereby all novel adaptations, modifications, and arrangements thereof which come within the practice of those skilled in the art to which the invention relates.

I claim:

1. A valve means operable by single and multiple input forces comprising:
   a housing including a valve chamber and a longitudinal bore;
   a first piston in said longitudinal bore having seal means at both ends thereof to prevent communication of fluid from one side of said piston to the other side of said piston;
   a second piston in said bore ahead of said first piston and operatively connected to said first piston so as to be relatively movable with respect to said first piston and controllable by said first piston, said second piston having a seal means for preventing fluid leakage by said second piston means;
   a valve in said housing operatively connected to said first and second pistons for controlling communication of a reference fluid pressure and a control fluid pressure to a valve control port in said housing, said valve including,
      a first valve seat formed on said housing,
      a plunger slidably guided by said housing and having a second valve seat on the forward end thereof which is arranged in said housing to the rear of said first valve seat so as to be movable towards said first valve seat, said plunger including a rearwardly projecting stem operatively connected to said second piston means in said longitudinal bore, said plunger also having a longitudinal passage therethrough,
      a poppet means comprising an annular surface for abutment with said first valve seat and a second surface operatively connected to said annular surface arranged to be abutted by said second valve seat as it moves in a direction of said first valve seat, said second surface being spring biased to the rear of said first surface and being operatively connected to a spool valve adapted to control an opening through the first annular surface, said second surface and said second valve seat being constructed so as to abut on an angle with respect to a plane passing through the abutment of said first annular surface on said first valve seat of said housing, and a means biasing said plunger so that said second valve seat is normally not in contact with said second surface so that reference pressure is communicated to said valve means via said passage through said plunger and said control pressure is prevented from communication to said valve control port by said valve mechanism.

2. A valve means according to claim 1 wherein said first piston may be further characterized as having a recessed portion between the seal means at both ends thereof and the longitudinal bore in the housing is provided with a vent opening that is in communication with this recessed portion to permit overboard venting of leakage fluid that would otherwise permit a malfunction in the operation of the said first piston.

3. A valve means according to claim 1 and further comprising a diaphragm for creating first and second variable volume chambers on either side thereof, which diaphragm is affixed to said housing and to said plunger.

4. A valve means according to claim 3 wherein said diaphragm is affixed to said plunger by means of a spring bearing plate having an internal flange for abutment with a shoulder on the plunger so as to position said plunger in abutting contact with said second piston means.

5. A valve means according to claim 1 wherein said housing further includes an inwardly directed collar on which the first valve seat is formed, which inwardly directed collar provides a guide and support for said plunger that is provided with radial passages about its periphery for fluid communication thereby.

6. A valve means according to claim 1 within a vehicle braking system that further comprises a hydraulic master cylinder and a pair of servomotors that are independently connected to the front and rear brakes of a vehicle, which valve means may be further characterized as including a connection to a vacuum source with said reference port and an opening in said housing forwardly of said poppet means for providing atmospheric pressure as a control fluid pressure.

References Cited
UNITED STATES PATENTS 2,219,689  10/1940  Kuiper _____ 303—31 X
3,275,381   9/1966  Pfeifer _____ 303—40 X DUANE A. REGER, *Primary Examiner.*